United States Patent
Monastiriotis et al.

(10) Patent No.: US 10,590,337 B2
(45) Date of Patent: Mar. 17, 2020

(54) HIGH PERFORMANCE PROPPANTS

(71) Applicant: Preferred Technology, LLC, Radnor, PA (US)

(72) Inventors: Spyridon Monastiriotis, Radnor, PA (US); Yu-Chin Li, Radnor, PA (US); Jada Shuchen Leung, Radnor, PA (US)

(73) Assignee: PREFERRED TECHNOLOGY, LLC, Radnor, PA (US)

( * ) Notice: Subject to any disclaimer, the term of this patent is extended or adjusted under 35 U.S.C. 154(b) by 137 days.

(21) Appl. No.: 15/153,099

(22) Filed: May 12, 2016

(65) Prior Publication Data

US 2016/0333259 A1  Nov. 17, 2016

Related U.S. Application Data

(60) Provisional application No. 62/160,649, filed on May 13, 2015.

(51) Int. Cl.
*C09K 8/80* (2006.01)

(52) U.S. Cl.
CPC ................................. *C09K 8/805* (2013.01)

(58) Field of Classification Search
CPC .......... C09K 8/805; C09K 8/536; C09K 8/80; C09K 8/68; C09K 8/64; C09K 8/90; C09K 2208/28; C09K 2208/10; C09K 2208/20; C09K 2208/32; C09K 3/1436; C09K 8/524; C09K 8/605; C09K 8/62; C09K 8/5751; C09K 8/5758; C09K 8/602; C09K 21/02; C09K 2208/12; C09K 2208/22; C09K 8/528; C09K 8/604; C09K 8/665; C09K 8/685; C09K 8/70

See application file for complete search history.

(56) References Cited

U.S. PATENT DOCUMENTS

| | | |
|---|---|---|
| 2,163,972 A | 6/1939 | Anderson |
| 2,366,007 A | 12/1944 | D'Alelio |
| 2,653,089 A | 9/1953 | Bulson |
| 2,823,753 A | 2/1958 | Henderson |
| 3,020,250 A | 2/1962 | Norwalk |
| 3,026,938 A | 3/1962 | Huitt |
| 3,392,148 A | 7/1968 | Hunter |
| 3,492,147 A | 1/1970 | Young et al. |
| 3,763,072 A | 10/1973 | Krieger |
| 3,805,531 A | 4/1974 | Kistner |
| 3,817,939 A | 6/1974 | Allen et al. |
| 3,837,892 A | 9/1974 | Marzocchi |
| 3,900,611 A | 8/1975 | Corbett et al. |
| 3,929,191 A | 12/1975 | Graham et al. |
| 3,931,428 A | 1/1976 | Reick |
| 3,971,751 A | 7/1976 | Isayama et al. |
| 3,976,135 A | 8/1976 | Anderson |
| 3,991,225 A | 11/1976 | Blouin |
| 4,074,760 A | 2/1978 | Copeland et al. |
| 4,113,014 A | 9/1978 | Kubens et al. |
| 4,177,228 A | 12/1979 | Prolss |
| 4,199,484 A | 4/1980 | Murphey |
| 4,252,655 A | 2/1981 | Carney |
| 4,273,910 A | 6/1981 | Lederer |
| 4,417,992 A | 11/1983 | Bhattacharyya et al. |
| 4,439,489 A | 3/1984 | Johnson et al. |
| 4,443,347 A | 4/1984 | Underdown et al. |
| 4,465,815 A | 8/1984 | Chattha |
| 4,493,875 A | 1/1985 | Beck et al. |
| 4,518,039 A | 5/1985 | Graham et al. |
| 4,547,469 A | 10/1985 | Jackson et al. |
| 4,554,188 A | 11/1985 | Holubka et al. |
| 4,585,064 A | 4/1986 | Graham et al. |
| 4,592,931 A | 6/1986 | Cargle |
| 4,594,268 A | 6/1986 | Kirwin |
| 4,623,589 A | 11/1986 | Simmonds, Jr. |
| 4,632,876 A | 12/1986 | Laird et al. |
| 4,680,230 A | 7/1987 | Gibb et al. |
| 4,732,920 A | 3/1988 | Graham et al. |
| 4,746,543 A | 5/1988 | Zinkan et al. |
| 4,785,884 A | 11/1988 | Armbruster |
| 4,792,262 A | 12/1988 | Kapps et al. |
| 4,801,635 A | 1/1989 | Zinkan et al. |
| 4,822,425 A | 4/1989 | Burch |
| 4,920,192 A | 4/1990 | Wiser-Halladay |
| 5,048,608 A | 9/1991 | Wiser-Halladay et al. |
| 5,092,404 A | 3/1992 | Falk et al. |
| 5,138,055 A | 8/1992 | Parekh |
| 5,181,957 A | 1/1993 | Gross et al. |
| 5,188,175 A | 2/1993 | Sweet |
| 5,194,174 A | 3/1993 | Roe et al. |
| 5,199,491 A | 4/1993 | Kutta et al. |

(Continued)

FOREIGN PATENT DOCUMENTS

| | | |
|---|---|---|
| CA | 2574808 C | 12/2010 |
| CN | 1149007 A | 5/1997 |

(Continued)

OTHER PUBLICATIONS

Office Action dated Jun. 6, 2017 in U.S. Appl. No. 14/528,070.
Notice of Allowance dated Jun. 12, 2017 in U.S. Appl. No. 14/266,179.
Chemicalland21, "Lauryl alcohol ethoxylates" Mar. 18, 2006, https://web.archive.org/web/20060318023334/http://www.chemicalland21.com/specialtychem/perchem/LAURYLY%20ALCOHOL%20ETHOXYLATE.htm.
Non-Final Office Action dated Aug. 25, 2016 in U.S. Appl. No. 15/073,840.
Ramirez et al., Synthesis of crosslinked and functionalized polystyrene by miniemulsion polymerization: particle size control, Macromex 2014.
Sigma-Aldrich, "Polybutadiene, hydroxyl terminated" Jun. 8, 2014, https://web.archive.org/web/20140608155646/http:product/alddrich/190799?lang=en&region=).
Non-final Office Action dated Dec. 6, 2016 in U.S. Appl. No. 14/673,340.

(Continued)

*Primary Examiner* — Kumar R Bhushan
(74) *Attorney, Agent, or Firm* — Pepper Hamilton LLP (57) ABSTRACT

Embodiments disclosed herein provide coated particles that can be used, for example, in the extraction of oil and gas from subterranean formations.

20 Claims, 4 Drawing Sheets

(56) References Cited

U.S. PATENT DOCUMENTS

| | | |
|---|---|---|
| 5,218,038 A | 6/1993 | Johnson et al. |
| 5,242,248 A | 9/1993 | Bramwell |
| 5,256,729 A | 10/1993 | Kutta et al. |
| 5,264,572 A | 11/1993 | Endo et al. |
| 5,330,836 A | 7/1994 | Buese et al. |
| 5,420,174 A | 5/1995 | Dewprashad |
| 5,422,183 A | 6/1995 | Sinclair et al. |
| 5,480,584 A | 1/1996 | Urano et al. |
| 5,582,249 A | 12/1996 | Caveny et al. |
| 5,597,784 A | 1/1997 | Sinclair et al. |
| 5,721,315 A | 2/1998 | Evans et al. |
| 5,728,302 A | 3/1998 | Connor et al. |
| 5,733,952 A | 3/1998 | Geoffrey |
| 5,824,462 A | 10/1998 | Ashida et al. |
| 5,837,656 A | 11/1998 | Sinclair et al. |
| 5,849,818 A | 12/1998 | Walles et al. |
| 5,856,271 A | 1/1999 | Cataldo et al. |
| 5,911,876 A | 6/1999 | Rose |
| 5,924,488 A | 7/1999 | Nguyen et al. |
| 5,955,144 A | 9/1999 | Sinclair et al. |
| 5,964,291 A | 10/1999 | Bourne et al. |
| 5,985,986 A | 11/1999 | Kubitza et al. |
| 6,071,990 A | 6/2000 | Yip et al. |
| 6,079,492 A | 6/2000 | Hoogteijling et al. |
| 6,093,469 A | 7/2000 | Callas |
| 6,093,496 A | 7/2000 | Dominguez et al. |
| 6,114,410 A | 9/2000 | Betzold |
| 6,127,308 A | 10/2000 | Slack et al. |
| 6,187,892 B1 | 2/2001 | Markusch et al. |
| 6,207,766 B1 | 3/2001 | Doi et al. |
| 6,270,692 B1 | 8/2001 | Geissler et al. |
| 6,306,964 B1 | 10/2001 | Evans et al. |
| 6,316,105 B1 | 11/2001 | Khudyakov et al. |
| 6,328,105 B1 | 12/2001 | Betzold |
| 6,372,842 B1 | 4/2002 | Grisso et al. |
| 6,387,501 B1 | 5/2002 | McCrary et al. |
| 6,406,789 B1 | 6/2002 | McDaniel et al. |
| 6,439,309 B1 | 8/2002 | Matherly et al. |
| 6,486,287 B2 | 11/2002 | McGall et al. |
| 6,528,157 B1 | 3/2003 | Hussain et al. |
| 6,582,819 B2 | 6/2003 | McDaniel et al. |
| 6,632,527 B1 | 10/2003 | McDaniel et al. |
| 6,668,926 B2 | 12/2003 | Nguyen et al. |
| 6,705,400 B1 | 3/2004 | Nguyen et al. |
| 6,732,800 B2 | 5/2004 | Acock et al. |
| 6,767,978 B2 | 7/2004 | Aubart et al. |
| 6,790,245 B2 | 9/2004 | Wolff et al. |
| 6,809,149 B2 | 10/2004 | Meyer et al. |
| 6,866,099 B2 | 3/2005 | Nguyen |
| 7,012,043 B2 | 3/2006 | Klein et al. |
| 7,074,257 B2 | 7/2006 | Lockwood et al. |
| 7,078,442 B2 | 7/2006 | Brown |
| 7,129,308 B2 | 10/2006 | McGall et al. |
| 7,135,231 B1 * | 11/2006 | Sinclair ............... C09K 8/805 428/407 |
| 7,153,575 B2 | 12/2006 | Anderson et al. |
| 7,157,021 B2 | 1/2007 | Bytnar et al. |
| 7,216,711 B2 | 5/2007 | Nguyen et al. |
| 7,244,492 B2 | 7/2007 | Sinclair et al. |
| 7,261,156 B2 | 8/2007 | Nguyen et al. |
| 7,270,879 B2 | 9/2007 | McCrary |
| 7,281,581 B2 | 10/2007 | Nguyen et al. |
| 7,318,472 B2 | 1/2008 | Smith |
| 7,318,474 B2 | 1/2008 | Welton et al. |
| 7,322,411 B2 | 1/2008 | Brannon et al. |
| 7,326,346 B2 | 2/2008 | Lovell et al. |
| 7,332,089 B2 | 2/2008 | Harjula et al. |
| 7,334,635 B2 | 2/2008 | Nguyen |
| 7,334,783 B2 | 2/2008 | Yoneyama et al. |
| 7,343,973 B2 | 3/2008 | Dusterhoft et al. |
| 7,344,783 B2 | 3/2008 | Shea |
| 7,350,571 B2 | 4/2008 | Nguyen et al. |
| 7,407,010 B2 | 8/2008 | Rickman et al. |
| 7,528,096 B2 | 5/2009 | Brannon et al. |
| 7,537,702 B2 | 5/2009 | Lupton et al. |
| 7,541,318 B2 | 6/2009 | Weaver et al. |
| 7,624,802 B2 | 12/2009 | McCrary et al. |
| 7,678,872 B2 | 3/2010 | Glass et al. |
| 7,721,804 B2 | 5/2010 | Duenckel |
| 7,726,399 B2 | 6/2010 | Brannon et al. |
| 7,754,659 B2 | 7/2010 | Rediger et al. |
| 7,772,163 B1 | 8/2010 | Brannon et al. |
| 7,789,147 B2 | 9/2010 | Brannon et al. |
| 7,803,742 B2 | 9/2010 | Bicerano et al. |
| 7,884,043 B2 | 2/2011 | Lisetskiy et al. |
| 7,896,080 B1 | 3/2011 | Watters et al. |
| 7,919,183 B2 | 4/2011 | McDaniel et al. |
| 7,921,910 B2 | 4/2011 | Wilson et al. |
| 7,999,013 B2 | 8/2011 | Brown |
| 8,006,754 B2 | 8/2011 | Bicerano |
| 8,006,755 B2 | 8/2011 | Bicerano |
| 8,052,890 B2 | 11/2011 | Nguyen |
| 8,133,587 B2 | 3/2012 | Rediger et al. |
| 8,183,179 B2 | 5/2012 | Garcia-Lopez De Victoria et al. |
| 8,236,738 B2 | 8/2012 | Zhang |
| 8,258,206 B2 | 9/2012 | Kanagasabapathy et al. |
| 8,298,667 B2 | 10/2012 | Smith et al. |
| 8,338,351 B2 | 12/2012 | Kanagasabapathy et al. |
| 8,349,911 B2 | 1/2013 | Kuehnle |
| 8,354,279 B2 | 1/2013 | Nguyen et al. |
| 8,360,149 B2 | 1/2013 | Hughes et al. |
| 8,431,220 B2 | 4/2013 | Wu et al. |
| 8,513,342 B2 | 8/2013 | Gao et al. |
| 8,664,151 B2 | 3/2014 | Haeberle et al. |
| 8,763,700 B2 | 7/2014 | McDaniel et al. |
| 8,778,495 B2 * | 7/2014 | Rediger ............... B22C 1/2246 428/403 |
| 8,785,356 B2 | 7/2014 | Plotnikov et al. |
| 8,796,188 B2 | 8/2014 | Pisklak et al. |
| 8,936,083 B2 | 1/2015 | Nguyen |
| 9,040,467 B2 | 5/2015 | McDaniel et al. |
| 9,624,421 B2 | 4/2017 | McDaniel et al. |
| 2001/0014453 A1 | 8/2001 | McGall et al. |
| 2002/0048676 A1 | 4/2002 | McDaniel et al. |
| 2003/0102128 A1 | 6/2003 | Dawson et al. |
| 2003/0131998 A1 | 7/2003 | Nguyen et al. |
| 2003/0196805 A1 | 10/2003 | Boney |
| 2003/0224165 A1 | 12/2003 | Anderson et al. |
| 2004/0010267 A1 | 1/2004 | Nakamura et al. |
| 2004/0023818 A1 | 2/2004 | Nguyen et al. |
| 2004/0129923 A1 | 7/2004 | Nguyen et al. |
| 2004/0138343 A1 | 7/2004 | Campbell et al. |
| 2004/0211561 A1 | 10/2004 | Nguyen et al. |
| 2005/0018193 A1 | 1/2005 | Chilese et al. |
| 2005/0019574 A1 | 1/2005 | McCrary |
| 2005/0034861 A1 | 2/2005 | Saini et al. |
| 2005/0173116 A1 | 8/2005 | Nguyen et al. |
| 2005/0274523 A1 | 12/2005 | Brannon et al. |
| 2006/0035790 A1 | 2/2006 | Okell et al. |
| 2006/0073980 A1 | 4/2006 | Brannon et al. |
| 2006/0157243 A1 | 7/2006 | Nguyen |
| 2006/0241198 A1 | 10/2006 | Motz et al. |
| 2006/0243441 A1 | 11/2006 | Cornelius de Grood et al. |
| 2006/0283599 A1 * | 12/2006 | Nguyen ............... C09K 8/52 166/305.1 |
| 2007/0021309 A1 | 1/2007 | Bicerano |
| 2007/0034373 A1 | 2/2007 | McDaniel et al. |
| 2007/0036977 A1 | 2/2007 | Sinclair et al. |
| 2007/0066742 A1 | 3/2007 | Mhetar et al. |
| 2007/0073590 A1 | 3/2007 | Cosentino et al. |
| 2007/0088137 A1 | 4/2007 | Georgeau et al. |
| 2007/0161515 A1 | 7/2007 | Bicerano |
| 2007/0204992 A1 | 9/2007 | Davis et al. |
| 2007/0207186 A1 | 9/2007 | Scanlon et al. |
| 2007/0208156 A1 | 9/2007 | Posey et al. |
| 2007/0209794 A1 | 9/2007 | Kaufman et al. |
| 2007/0215354 A1 | 9/2007 | Rickman et al. |
| 2007/0228322 A1 | 10/2007 | Chaves et al. |
| 2007/0289781 A1 | 12/2007 | Rickman et al. |
| 2008/0011478 A1 | 1/2008 | Welton et al. |
| 2008/0063868 A1 | 3/2008 | Chung et al. |
| 2008/0087429 A1 * | 4/2008 | Brannon ............... C09K 8/62 166/280.1 |
| 2008/0202744 A1 | 8/2008 | Crews et al. |

(56) References Cited

U.S. PATENT DOCUMENTS

| | | |
|---|---|---|
| 2008/0202750 A1 | 8/2008 | Rediger et al. |
| 2008/0226704 A1 | 9/2008 | Kigoshi et al. |
| 2008/0230223 A1 | 9/2008 | McCrary et al. |
| 2008/0236825 A1 | 10/2008 | Barmatov et al. |
| 2008/0318812 A1 | 12/2008 | Kakadjian, Sr. et al. |
| 2009/0029097 A1 | 1/2009 | Riddle et al. |
| 2009/0044942 A1 | 2/2009 | Gupta |
| 2009/0176667 A1 | 7/2009 | Nguyen |
| 2009/0238988 A1 | 9/2009 | McDaniel et al. |
| 2010/0028542 A1 | 2/2010 | Reese et al. |
| 2010/0065271 A1* | 3/2010 | McCrary ............... C09K 8/805 166/278 |
| 2010/0105817 A1 | 4/2010 | Arkles et al. |
| 2010/0132943 A1 | 6/2010 | Nguyen et al. |
| 2010/0147507 A1 | 6/2010 | Korte et al. |
| 2010/0196621 A1 | 8/2010 | Larson-Smith et al. |
| 2010/0212898 A1 | 8/2010 | Nguyen et al. |
| 2010/0282462 A1 | 11/2010 | Xu et al. |
| 2010/0286000 A1 | 11/2010 | Huang et al. |
| 2011/0016837 A1 | 1/2011 | Fischer et al. |
| 2011/0024129 A1 | 2/2011 | Turakhia et al. |
| 2011/0053809 A1 | 3/2011 | Sanders et al. |
| 2011/0120719 A1 | 5/2011 | Soane et al. |
| 2011/0160097 A1 | 6/2011 | Mirzaei et al. |
| 2011/0162837 A1 | 7/2011 | O'Malley et al. |
| 2011/0244125 A1 | 10/2011 | Weisenberg et al. |
| 2011/0272146 A1 | 11/2011 | Green et al. |
| 2011/0297383 A1* | 12/2011 | Tanguay ............... C09K 8/805 166/308.1 |
| 2012/0018162 A1 | 1/2012 | Tanguay et al. |
| 2012/0267105 A1 | 10/2012 | Zhang |
| 2012/0277130 A1 | 11/2012 | Usova |
| 2012/0279703 A1 | 11/2012 | McDaniel et al. |
| 2012/0283153 A1 | 11/2012 | McDaniel et al. |
| 2012/0283155 A1 | 11/2012 | Huang et al. |
| 2012/0295114 A1* | 11/2012 | Rediger ............... B22C 1/2246 428/404 |
| 2012/0322925 A1 | 12/2012 | Arigo et al. |
| 2013/0005856 A1 | 1/2013 | Phonthammachai et al. |
| 2013/0037048 A1 | 2/2013 | Edgington et al. |
| 2013/0045901 A1 | 2/2013 | Bicerano |
| 2013/0048365 A1 | 2/2013 | Kim et al. |
| 2013/0065800 A1 | 3/2013 | McDaniel et al. |
| 2013/0081812 A1 | 4/2013 | Green et al. |
| 2013/0164449 A1 | 6/2013 | Tadepalli et al. |
| 2013/0184381 A1 | 7/2013 | Bilodeau et al. |
| 2013/0186624 A1 | 7/2013 | McCrary et al. |
| 2013/0203917 A1 | 8/2013 | Harris et al. |
| 2013/0233545 A1 | 9/2013 | Mahoney et al. |
| 2013/0312974 A1 | 11/2013 | McClung, IV |
| 2014/0060826 A1 | 3/2014 | Nguyen |
| 2014/0060831 A1 | 3/2014 | Miller |
| 2014/0060832 A1 | 3/2014 | Mahoney et al. |
| 2014/0116698 A1 | 5/2014 | Tang et al. |
| 2014/0144631 A1 | 5/2014 | Weaver et al. |
| 2014/0162911 A1 | 6/2014 | Monastiriotis et al. |
| 2014/0262247 A1 | 9/2014 | Duenckel et al. |
| 2014/0274819 A1 | 9/2014 | McCrary et al. |
| 2014/0305650 A1 | 10/2014 | Song et al. |
| 2014/0338906 A1 | 11/2014 | Monastiriotis et al. |
| 2015/0034314 A1 | 2/2015 | Hudson et al. |
| 2015/0119301 A1 | 4/2015 | McDaniel et al. |
| 2016/0376496 A1 | 12/2016 | Gershanovich et al. |

FOREIGN PATENT DOCUMENTS

| | | | |
|---|---|---|---|
| CN | 101641211 A | | 2/2010 |
| CN | 102203211 B | | 12/2013 |
| CN | 103889706 A | | 6/2014 |
| DE | 102010051817 A1 | | 5/2012 |
| EP | 0207668 A1 | | 1/1987 |
| EP | 2440630 A1 | | 4/2012 |
| EP | 2469020 A1 | | 6/2012 |
| GB | 1294017 A | | 10/1972 |
| MX | 2013012807 A | | 8/2014 |
| WO | 2005121272 A1 | | 12/2005 |
| WO | 2010049467 A1 | | 5/2010 |
| WO | 2013048365 A1 | | 4/2013 |
| WO | 2013112251 A1 | | 8/2013 |
| WO | 2013158306 A1 | | 10/2013 |
| WO | 2014144464 A2 | | 9/2014 |

OTHER PUBLICATIONS

Notice of Allowance dated Dec. 8, 2016 in U.S. Appl. No. 14/314,573.
AkzoNobel Declaration of Compliance Bindzil CC401, Eka Chemical, Jan. 27, 2010, pp. 1-4.
AkzoNobel Silane Modified Colloidal Silca Bindzil CC in Waterborne Coating Applications Use and Benefits, 2011, pp. 1-6.
Boster, Ronald S., A Study of Ground-Water Contamination Due to Oil-Field Brines in Morrow and Delaware; Counties, Ohio, With Emphasis on Detection Utilizing Electrical Resistivity Techniques, The Ohio State University,; 1967.
Cao et al., Mesoporous SiO2-supported Pt Nanoparticles for catalytic application, ISRN Nanomaterials, 2013, Article ID 745397, 7 pages.
Carbo Ceramics, Topical Reference, Physical Properites of Proppants, 2011, pp. 1-5.
EPA, Oil and Gas Extraction, Compliance and Enforcement History, Sector Notebook Project, Oct. 2000, pp. 115-155.
Final Office Action dated Apr. 29, 2016 in U.S. Appl. No. 14/798,774.
Final Office Action dated May 3, 2016 in U.S. Appl. No. 14/266,179.
Final Office Action dated May 27, 2016 in U.S. Appl. No. 13/837,396.
Halimoon, Removal of heavy metals from textile wastewater using zeolite, Environment Asia, 2010, 3(special issue):124-130.
Hui et al., Removal of mixed heavy metal ions in wasterwater by zeolite 4A and residual products from recycled coal fly ash, Jounal of Hazardous Materials, Aug. 1, 2005, vol. B124, pp. 89-101.
Huntsman, JEFFCAT Amine Catalysts for the Polyurethane Industry, Americas Region, 2010, pp. 1-4.
Huntsman, Performance Products, JEFFCAT catalysts for the polyurethane industry, Asia Pacific, 2010, pp. 1-6.
Huntsman, The JEFFAMINE Polyetheramines, 2007.
International Search Report and Written Opinion issued in PCT/US2012/036093 dated Aug. 14, 2012.
International Search Report and Written Opinion issued in PCT/US2012/047519 dated Nov. 2, 2012.
International Search Report and Written Opinion issued in PCT/US2012/053277 dated Nov. 20, 2012.
International Search Report issued in PCT/US2012/070844 dated Mar. 8, 2013.
Interstate Oil and Gas Compact Commission and ALL Consulting, A Guide to Practical Management of Produced; Water from Onshore Oil and Gas Operations in the United Sates, Oct. 2006.
Kuang et al., Controllable fabrication of SnO2-coated multiwalled carbon nanotubes by chemical vapor deposition, Carbon 2006 44(7):1166-1172.
Madaan and Tyagi, Quaternary pryidinium salts: a review, J Oleo Sci 2008 57(4):197-215.
Mellaerts et al., Enhanced release of itraconazole from ordered mesoporous SBA-15 silica materials, Chem Commun 2007 7(13):1375-7.
Non-Final Office Action dated Mar. 18, 2016 in U.S. Appl. No. 13/355,969.
Non-Final Office Action dated Apr. 5, 2016 in U.S. Appl. No. 13/897,288.
Non-Final Office Action dated Apr. 5, 2016 in U.S. Appl. No. 14/314,573.
Notice of Allowance dated Dec. 22, 2015 in U.S. Appl. No. 13/626,055.
Official Action dated Nov. 30, 2015 from U.S. Appl. No. 14/798,774.
Polyurethanes, Ullmann's Encyclopedia of Industrial Chemistry, 2012, vol. 29.
Sanchez, Mariano, FRAC Packing: Fracturing for Sand Control, Middle East and Asia Reservoir Review, Nov. 8, 2007, pp. 37-49.
The removal of heavy metals cations by natural zeolites; retrieved from the internet http://www.resultsrna.com/research/zeolite_binds_heavy_metals.php; Aug. 31, 2011.

(56) References Cited

OTHER PUBLICATIONS

Wikipedia, Methylene diphenyl diisocyanate, retrieved from the internet http://en.wikipedia.org/wiki/Methylene_diphenyl_diisocyanate; Jul. 21, 2011.
Wingenfelder et al., Removal of heavy metals from mine waters by natural zeolites, Environ Sci Technol, 2005, 39:4606-4613.
Notice of Allowance dated Oct. 31, 2016 in U.S. Appl. No. 13/355,969.
Notice of Allowance dated Nov. 9, 2016 in U.S. Appl. No. 14/015,629.
Non-final Office Action dated Aug. 29, 2017 in U.S. Appl. No. 15/003,118.
Non-final Office Action dated Sep. 8, 2017 in U.S. Appl. No. 14/713,235.
Notice of Allowance dated Sep. 12, 2017 in U.S. Appl. No. 15/073,840.
Final Office Action dated Apr. 27, 2017 in U.S. Appl. No. 15/073,840.
Final Office Action dated Apr. 1, 2017 in U.S. Appl. No. 13/897,288.
Momentive Safety Data Sheet, 2015.
Non-final Office Action dated Feb. 17, 2017 in U.S. Appl. No. 14/713,235.
Non-final Office Action dated Jul. 12, 2017 in U.S. Appl. No. 14/798,774.
Non-final Office Action dated Jul. 26, 2017 in U.S. Appl. No. 14/673,340.
Non-final Office Action dated Jan. 19, 2018 in U.S. Appl. No. 15/345,283.
Final Office Action dated Oct. 24, 2017 U.S. Appl. No. 15/461,694.
Nonfinal Office Action dated Oct. 4, 2017 received in U.S. Appl. No. 13/897,288.
Notice of Allowance dated Aug. 8, 2016 in U.S. Appl. No. 13/837,396.
Non-final Office Action dated Nov. 24, 2017 in U.S. Appl. No. 15/070,819.
Nonfinal Office Action dated Mar. 16, 2018 in U.S. Appl. No. 14/713,236.
Final Office Action dated Mar. 15, 2018 in U.S. Appl. No. 14/798,774.
Final Office Action dated Jan. 18, 2018 in U.S. Appl. No. 14/528,070.
Notice of Allowance dated May 17, 2018 in U.S. Appl. No. 15/461,694.
Non-final Office Action dated Jun. 26, 2018 in U.S. Appl. No. 15/709,781.
Final Office Action dated Jul. 6, 2018 in U.S. Appl. No. 15/070,819.
Notice of Allowance dated Aug. 6, 2018 in U.S. Appl. No. 13/897,288.
Final Office Action dated Jul. 10, 2019 in U.S. Appl. No. 15/823,699.
Final Office Action dated Apr. 12, 2019 in U.S. Appl. No. 14/673,340.
Non-Final Office Action dated Jul. 25, 2019 in U.S. Appl. No. 14/928,379.
Non-Final Office Action dated Feb. 4, 2019 in U.S. Appl. No. 15/070,819.
Non-final Office Action dated Jul. 18, 2019 in U.S. Appl. No. 15/572,877.
Non-final Office Action dated Sep. 13, 2018 in U.S. Appl. No. 14/673,340.
Notice of Allowance dated Sep. 12, 2019 in U.S. Appl. No. 15/070,819.

* cited by examiner

HIGH PERFORMANCE PROPPANTS

CROSS-REFERENCE TO RELATED APPLICATIONS

This application claims priority to U.S. Provisional Application No. 62/160,649, filed May 13, 2015, which is hereby incorporated by reference in its entirety.

FIELD

Embodiments disclosed herein relate to, for example, high performance proppants.

BACKGROUND

Hydraulic fracturing is an often used technique to increase the efficiency and productivity of oil and gas wells. Overly simplified, the process involves the introduction of a water-based, oil-base or emulsion fracturing fluid into the well and the use of fluid pressure to fracture and crack the well stratum. The cracks allow the oil and gas to flow more freely from the stratum and thereby increase production rates in an efficient manner.

There are many techniques involved in well fracturing, but one technique is the use of a solid "proppant" to keep the stratum cracks open as oil, gas, water and other fluids found in well flow through those cracks. The proppant is carried into the well by the fracturing fluid which itself may contain a variety of viscosity enhancers, gelation agents, surfactants, etc. The proppants require certain properties to be useful, and there is still a need for proppants with improved properties and compositions that are more environmentally friendly. The embodiments disclosed herein satisfy these needs as well as others.

SUMMARY

Embodiments disclosed herein provide coated particles comprising a particle; and a coating comprising at least one phenol-aldehyde resin layer and at least one epoxy emulsion layer and/or a layer comprising a mixture of phenol-aldehyde resin and epoxy emulsion. In some embodiments, the particle is coated with an outer polyurethane layer.

Embodiments disclosed herein provide coated particles comprising a particle; and a coating comprising at least one phenol-aldehyde resin layer and/or at least one polyurethane layer.

Embodiments disclosed herein provide coated particles comprising a particle, a first layer, a second layer, a third layer, and a fourth layer, wherein the first layer encapsulates the particle, the second layer encapsulates the first layer, the third layer encapsulates the second layer, and the fourth layer encapsulates the third layer, wherein the first layer is a phenol-aldehyde resin layer, the second layer is a phenol-aldehyde resin layer, the third layer is a phenol-aldehyde resin layer, and the fourth layer is an epoxy emulsion layer or a polyurethane layer.

Embodiments disclosed herein provide processes for preparing a coated particle, the process comprising coating a particle with at least one phenol-aldehyde resin layer; and coating the particle coated with the phenol-aldehyde resin layer with an epoxy emulsion layer, wherein the phenol-aldehyde resin layer has less than or equal to 0.5 wt % free phenol.

Embodiments disclosed herein provide methods of treating a subterranean formation penetrated by a wellbore comprising contacting the subterranean formation with a coated particle as described herein.

DETAILED DESCRIPTION

Unless otherwise defined, all technical and scientific terms used herein have the same meaning as commonly understood by one of ordinary skill in the art to which these embodiments belong. Although methods and materials similar or equivalent to those described herein can be used in the practice or testing of the embodiments, suitable methods and materials are described below. All publications, patent applications, patents, and other references mentioned herein are incorporated by reference in their entirety. In the case of conflict, the present specification, including definitions, will control. In addition, the materials, methods, and examples are illustrative only not intended to be limiting. Other features and advantages of the embodiments will be apparent from the following detailed description and claims.

For the purposes of promoting an understanding of the embodiments described herein, reference will be made to embodiments and specific language will be used to describe the same. The terminology used herein is for the purpose of describing particular embodiments only.

As used throughout this disclosure, the singular forms "a," "an," and "the" include plural reference unless the context clearly dictates otherwise. Thus, for example, a reference to "a composition" includes a plurality of such compositions, as well as a single composition.

The term "about", as used herein when referring to a measurable value is meant to encompass variations of +/−10% from the specified amount.

As used in this document, terms "comprise," "have," "has," and "include" and their conjugates, as used herein, mean "including but not limited to." While various compositions, and methods are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

The proppants described herein can be used in the extraction of oil and gas from wells. Proppants can be used in processes that are commonly known as "fracking." The proppants described herein can be used near sources of drinking water because of their low free phenol content and the low risk of phenol contamination into the drinking water.

The proppants can also be more environmentally friendly because of the effective use of a cross-linker such as hexamine that can be used to cross-link/cure thermoplastic resins such as phenol-aldehyde in the process of preparing/coating the proppant. Furthermore, when the outer layer is an epoxy emulsion outer layer or polyurethane layer, the proppant is also "sealed" to prevent or limit the leeching of the free phenol or unreacted formaldehyde that may be present in the proppant. This is an unexpected advantage of the proppants (particles) described herein.

Coated proppants can be used in order to increase production rate of the well. For high temperature wells such as those with bottom hole temperature above 200° F. the high crack closure stresses are above 6,000 psi and often above 10,000 psi, so the proppant must resist such closure stresses in order to keep the fracture cracks open and maintain fracture conductivity.

The epoxy emulsion also provides other advantages. The water content in the emulsion reduces the heat that is generated during the preparation process and reduces agglomeration which enables the proppants to flow more easily during the preparation process and increases the overall yield of the coating process. The epoxy emulsion can provide another significant advantage of consisting of nano-size emulsified particles of a high molecular epoxy resin. Their diameter is less than 1200 nm, less than 800 nm, or less than 600 nm. Their small diameter ensures the coating uniformity of, for example a thin, outer layer with significant effects on its thermo-mechanical properties and also seals the inner phenol-aldehyde resin layer.

Coating stability is crucial not only for the overall integrity of the substrate re-inforcement but also for its significant effect on the cross-linkers and the cross-linking mechanism of the fracturing fluids and therefore their ability to properly transfer and place the proppant into the fractures. Nimerick et al. illustrated that (a) use of pH buffering additives with appropriate adjustments of crosslinker concentration produces stable crosslinked gels in the presence of curable phenolic resin coated proppant, (b) the addition of the phenolic resin coated proppant to organo-metallic cross-linked fracturing fluids can interfere with the crosslinking mechanism, thereby adversely affecting stability, (c) rheological tests show that the curable resin coated proppant causes a substantial reduction of gel stability when used with high-pH organometallic crosslinked fracturing gels and (d) loss of the metal crosslinker to the resin coated proppant surface varied from 12% to 30%. Epoxy emulsion and polyurethane outer layers provide coating stability by reducing drastically resin losses and preventing leaching of free phenols and oligomeric low molecular weight phenolic resins when immersed into the fracturing fluids The proppants comprising an epoxy emulsion layer as described herein surprisingly have strong conductivity and stability properties. These advantages could not have been predicted. In fact, prior to the present disclosure, one of skill in the art would not have expected a proppant coated with a layer comprising an epoxy emulsion to have the properties it has and be considered a high performance proppant (e.g. stable at high temperatures and high closure stresses). Thus, the proppants described herein provide unexpected results and superior properties as compared to previous proppants.

The coated proppants can also have increased crush resistance. In some embodiments, the coated proppant exhibits a crush test result of 15,000 psi less than 6%, less than 4%, or less than 3% fines under testing according to ISO 13503-2:2006.

As used herein, the term "proppant" or "proppant solid" can be any small solid or porous particle with an adequate crush strength and lack of chemical reactivity. Non-limiting examples of proppants include, but are not limited to, sand, ceramic particles (such as aluminum oxide, silicon dioxide, titanium dioxide, zinc oxide, zirconium dioxide, cerium dioxide, manganese dioxide, iron oxide, calcium oxide or bauxite) which can be coated as described herein. Other examples include, but are not limited to, particulate sintered ceramics, such as aluminum oxide, silica, or bauxite, including with clay-like binders or other additives to increase the particulate's compressive strength, especially sintered bauxite; natural, relatively coarse, sand, the particles of which are roughly spherical, generally called "frac sand"; resin-coated particulates of these materials and composite particles or composite particles containing a solid or porous solid core in which a contaminant removal agent is an integral part of the solid core or disposed within pores of the porous solid core. In some embodiments, particle core is sand, silica, rocks, minerals, ceramic, bauxite, polymeric particles, or any combination thereof.

In some embodiments, a testing method for proppant performance is described in ISO 13503-5:2006(E) "Procedures for measuring the long term conductivity of proppants." The ISO 13503-5:2006 provides standard testing procedures for evaluating proppants used in hydraulic fracturing and gravel packing operations. ISO 13503-5:2006 provides a consistent methodology for testing performed on hydraulic fracturing and/or gravel packing proppants. The "proppants" mentioned henceforth in this part of ISO 13503-5:2006 refer to, for example, but not limited to, sand, ceramic media, resin-coated proppants, gravel packing media, and other materials used for hydraulic fracturing and gravel-packing operations. ISO 13503-5:2006 is not applicable for use in obtaining absolute values of proppant pack conductivities under downhole reservoir conditions, but it does serve as a consistent method by which such downhole conditions can be simulated and compared in a laboratory setting. In some embodiments, the proppants to be coated have an average particle size from about 50 μm to about 3000 μm. In some embodiments, the size is from about 100 μm to about 2000 μm. The proppant can also be referred to as a particle that can be coated.

In some embodiments, the proppant has a distribution of particles having sizes from about 4 mesh to about 100 mesh (U.S. Standard Sieve numbers), i.e., the particles pass through a screen opening of about 4760 microns (4 mesh) and are retained on a screen opening of about 150 microns (100 mesh). In some embodiments, the proppants have a distribution of particle sizes in which 90% are within the range of about 8 mesh to about 100 mesh. In some embodiments, the proppants have a distribution of particle sizes from about 16 mesh to about 70 mesh. In some embodiments, the proppants have a distribution of particle sizes with at least 90% by weight of the particles having a size within a desired range, such as the range of about 20 mesh to about 40 mesh, i.e., from about 850 to about 425 microns. In some embodiments, the particle is a size of 20/40 mesh or 30/50 mesh.

In some embodiments, examples of organofunctional silane coupling agents for use as an adhesion promoter between the substrate and the coating are, but not limited to, 3-glycidyloxypropyltrimethoxysilane, 3-glycidyloxypropyl-triethoxysilane, epoxycyclohexyl)ethyltrimethoxysilane, and 2-(3,4-epoxycyclohexyl)ethyltriethoxysilane; 3-[2-(2-aminoethylamino)ethylamino]propyl-trimethoxysilane (CAS No. 35141-30-1); 3-(2-aminomethylamino) propyltriethoxysilane (CAS No. 5089-72-5); 3-mercaptopropyl-trimethoxysilane (CAS No. 4420-74-0); n-propyltrimethoxysilane (CAS No. 1067-25-0); [3-(2-aminoethyl) aminopropyl]trimethoxysilane (CAS No. 1760-24-3); silane n-dodecyltrimethoxysilane (CAS No. 3069-21-4); bis(trimethoxysilylpropyl) amine (CAS No. 82985-35-1); 1,2-bis(trimethoxysilyl)ethane (CAS No. 18406-41-2); vinyltri(2-methoxyethoxy) silane (CAS No. 1067-53-4); n-octyltriethoxysilane (CAS No. 2943-75-1); bis[3-(triethoxysilyl) propyl]tetrasulfide (CAS No. 40372-72-3); vinyltriethoxysilane (CAS No. 78-08-0); 3-glycidoxypropyl-trimethoxysilane (CAS No. 2530-83-8); 3-mercaptopropyl-triethoxysilane (CAS No. 14814-09-6); 3-glycidoxypropyl-triethoxysilane (CAS No. 2602-34-8); 2-(3,4-epoxycyclohexyl)ethyl]trimethoxysilane (CAS No. 3388-04-3); 3-aminopropyltrimethoxysilane (CAS No. 13822-56-5); 2-(3,4-epoxycyclohexyl)ethyl]triethoxysilane (CAS No. 10217-34-2); 3-aminopropyltriethoxysilane (CAS No. 919-30-2); 3-glycidoxypropyl-methyldimethoxysilane (CAS No. 65799-47-5); bis(triethoxysilylpropyl)amine (CAS No. 13497-18-2); 3-(2-aminoethylamino) propyldimethoxymethylsilane (CAS No. 3069-29-2); N-(n-Butyl)-3-aminopropyltrimethoxysilane (CAS No. 31024-56-3); n-propyltriethoxysilane (CAS No. 2550-02-9); vinyltrimethoxysilane (CAS No. 2768-02-7); 3-ureidopropyltriethoxy-silane (CAS No. 23779-32-0); 3-methacryloxypropyl-trimethoxysilane (CAS No. 2530-85-0); Poly[3-(2-aminoethyl)aminopropyl] methylsiloxane hydroxy-terminated (CAS No. 106214-80-6)

In some embodiments, coated particles are provided. In some embodiments, the particle comprises a coating comprising at least one phenol-aldehyde resin layer and at least one epoxy emulsion layer. In some embodiments, the particle is coated with an outer polyurethane layer. In some embodiments, the coated particle comprises a organofunctional silane as a coupling agent. In some embodiments, the silane is a hydroxy-terminated amino-functional silane. Non-limiting examples are provided herein.

In some embodiments, the epoxy emulsion layer comprises an epoxy resin and an epoxy hardener or curing agent. Examples of epoxy hardeners and curing agents include, but are not limited to, aliphatic amines (e.g. Diethylene-triamine (DETA), triethylenetetraamine (TETA), tetraethylenepentamine (TEPA), aminoethylpiperazine (N-AEP), m-xylenediamine (MXDA), 2-methylpentanediamine (MPMD)); cycloaliphatic amines (e.g. Isophoronediamine (IPDA), methylene-di(cyclohexylamine) (PACM), diaminocyclohexane); aromatic amines (e.g. 4,4'-Diaminodiphenyl methane (DDM), 4,4'-Diaminodiphenyl sulfone (DDS), methylene-bis(diisopropylaniline) (MPDA), methylene-bis(dimethylaniline), diethyl toluene diamine (DETDA); and anhydrides (e.g., hexahydrophthalic acid anhydride, dicyclopentadiene dianhydride, mellitic anhydride, methyl tetrahydrophthalic anhydride, and nadic methyl anhydride). In some embodiments, the hardener or curing agent is triethylenetetraamine.

In some embodiments the polyurethane outer coating comprises an isocyanate and a polyol. The isocyanate may have a functionality greater or equal than two (e.g. two or more —NCO reactive groups) and could be a polymeric diphenylmethane diisocyanate (pMDI), diphenylmethane diisocyanate (MDI), toluene disocyanate (TDI), hexamethylene isocyanate (HDI) and mixtures thereof. The polyol could be a polyether polyol with a functionality greater or equal than two (e.g. two or more —OH reactive groups). Suitable polyether polyols are, but not limited to, polyethylene glycol (PEG), polypropylene glycol (PPG), polytetramethylene ether glycol (PTMEG), polyoxypropylene polyol, polyoxyethylene polyol, poly-1,2-oxybutylene polyoxyethylene glycol, poly-1,4-tetramethylene and polyoxyethylene glycol and mixtures thereof. In some embodiments, the polyurethane outer coating has an NCO index (stoichiometric ratio of the isocyanate moieties to the hydroxyl moieties) of 0.7 to 7.0.

In some embodiments, the phenol-aldehyde resin layer has less than or equal to about 0.5%, about 0.4%, about 0.3%, about 0.2%, or about 0.1% free phenol. In some embodiments, the phenol-aldehyde resin layer has less than or equal to about 1.0% free phenol. The low level of free phenol present in the coating provides an environmentally friendly coated particle that can be used as a proppant. For example, the low levels of excess free phenol eliminate potential environmental concerns by volatilizing of phenol during coating. In addition the coated particles have reduced risk of leaching contaminants into drinking water or other environmentally sensitive places.

In some embodiments, the particle comprises at least two phenol-aldehyde resin layers. In some embodiments, the particle comprises at least three phenol-aldehyde resin layers.

In some embodiments, at least one of the at least one phenol-aldehyde resin layers is fully cured. "Fully cured" is used herein as it is used by one of ordinary skill in the art. In some embodiments, the coated particle comprises two fully cured phenol-aldehyde resin layers. In some embodiments, the coated particle comprises at least one fully cured phenol-aldehyde resin layer and one partially cured phenol-aldehyde resin layer. A partially cured phenol-aldehyde layer is a layer that is not fully cured. In some embodiments, a partially cured layer is, or is about, 80, 81, 82, 83, 84, 85, 86, 87, 88, 89, 90, 91, 92, 93, 94, 95, or 96% cured. Curing can also refer to the epoxy emulsion layer after the water has evaporated or removed by other methods.

In some embodiments, the coated particle comprises at least one fully cured phenol-aldehyde resin layer, one partially cured phenol-aldehyde resin layer, and an epoxy emulsion layer.

An epoxy emulsion layer refers to a layer that is applied to the particle as an emulsion that contains water. The water can evaporate or be removed from the particle leaving an epoxy layer. However, in some embodiments, at some point, the particle can comprise what would be considered an epoxy emulsion layer even though the layer may change due to the removal of water through evaporation or other drying process.

In some embodiments, the particle comprises an outer layer. The outer layer can be an epoxy emulsion, a phenol-aldehyde resin layer, a polyurethane layer, or a combination thereof. The outer layer can also be referred to as a topcoat. Although various embodiments disclosed herein reference epoxy emulsion layers, the epoxy emulsion layer can be replaced with a polyurethane layer.

In some embodiments, the outer layer is an epoxy emulsion layer of an epoxy resin with a viscosity from about 5000 to about 60000 mPa·s at 25° C. In some embodiments, the viscosity is from about 9000 to about 50000 mPa·s at 25° C. In some embodiments, the viscosity is from about 15000 to about 35000 mPa·s at 25° C. In some embodiments, the viscosity from about 20000 to about 30000 mPa·s at 25° C.

In some embodiments, the outer layer is a mixture of a phenol-aldehyde resin and an epoxy emulsion that forms an outer layer of a phenol-aldehyde/epoxy resin layer. The epoxy emulsion can have the viscosity and other properties as described herein.

In some embodiments, the particle can have alternating layers. For example, in some embodiments, the coated particle comprises a first phenol-aldehyde resin layer, a second phenol-aldehyde resin layer, a first epoxy emulsion layer, and a second epoxy emulsion layer, wherein: the first epoxy emulsion layer encapsulates the first phenol-aldehyde resin layer; the second phenol-aldehyde resin layer encapsulates the first epoxy emulsion layer, and the second epoxy emulsion layer encapsulates the second phenol-aldehyde resin layer. The order of the layers can vary on the particle. For example, in some embodiments, the particle has an inner most phenol-aldehyde resin layer and an outermost (topcoat) layer that is the epoxy emulsion. In some embodiments, the layers are reversed, such that the epoxy emulsion layer is the inner most layer and the phenol-aldehyde resin layer is the outermost layer. However, as described herein, there can be various combinations of layers, wherein the particle has multiple phenol-aldehyde resin layers with an outer epoxy emulsion layer topcoat. In some embodiments, the particle has 1, 2, 3, or 4 phenol aldehyde resin layers and a final epoxy emulsion outer layer. As described herein, the phenol aldehyde resin layers can have different properties, such as different hardness based upon whether the layer is cured or not fully cured.

In some embodiments, the coated particle comprises an epoxy emulsion outer layer, a first interior phenol-aldehyde resin layer, a second interior phenol-aldehyde resin layer, and a third interior layer. In some embodiments, the first layer is in contact with the epoxy emulsion layer and the second interior phenol-aldehyde resin layer. In some embodiments, the second interior layer is contact with the first interior layer and the third interior layer. In some embodiments, the third interior layer is in contact with the second interior layer and the core particle. Thus, in some embodiments, the coated particle has a structure proceeding from the outside to the inside of an epoxy emulsion outer layer, the first interior layer, the second interior layer, the third interior layer, and the core particle.

In some embodiments, the third interior layer can be an epoxy emulsion layer, a phenol-aldehyde resin layer, or a combination thereof. In some embodiments, the combination is a ratio of about 80:20 phenolic aldehyde-resin to epoxy emulsion resin. In some embodiments, the ratio is based upon the weight of the epoxy not the water present in the emulsion. In some embodiments, the ratio is about 95:05, about 90:10, about 70:30, about 60:40, or about 50:50 (equal parts).

In some embodiments, the first interior layer is a cured phenol-aldehyde resin layer. The layer can be fully cured or substantially cured. In some embodiments, the second interior layer is a phenol-aldehyde resin layer that has a lower average molecular weight than the first interior layer, which can also be a phenol-aldehyde resin layer. In some embodiments, it has an average molecular weight that is about, or at least, 1, 2, 4, 5, 10, 15, 20, or 25% lower than the average molecular weight of the first interior layer.

The embodiments described herein refer to various layers. The layers can be complete such that each layer encapsulates the entire particle or the previous layer. The layers can also form a complete layer by overlapping one another. For example, a first phenol-aldehyde resin layer can be applied to a core particle in increments, with each increment overlapping the previous one until the particle is completely encapsulated. This would be similar to overlapping shingles on a roof. In some embodiments, the layer is a single complete layer and does not have overlapping segments to form the complete layer. In some embodiments, one of the layers is a single complete layer whereas additional layers are made of overlapping segments to form the layer. In some embodiments, none of the layers comprise overlapping segments to form a layer.

The epoxy emulsion layer can be any suitable epoxy emulsion. Examples of epoxy emulsions include, but are not limited to, novolac epoxy emulsions, and the like. Suitable epoxy emulsions are, but not limited to, DER 916 and XZ92546.01, (Dow Chemical) In some embodiments, the epoxy emulsion layer is about 20 to about 60 wt. % water. In some embodiments, the epoxy emulsion layer is about 30 to about 60, about 40 to about 60, about 50 to about 60, about 20 to about 50, about 30 to about 50, about 40 to about 50, about 20 to about 40, about 30 to about 40, about 20 to about 30 wt. % water.

In some embodiments, the coated particle comprises an epoxy resin in an amount of about 0.25% to about 2.00% wt/wt solids. The % wt can be determined based upon the coated particle after the water in the emulsion is removed, dried, or evaporated away from the particle. Thus, the epoxy resin weight does not include the weight of the water that is present in the emulsion. This can be when the epoxy resin is the outermost layer (e.g. topcoat) or when the epoxy resin is not the outer layer.

The phenol-aldehyde resin layer can be any suitable phenol-aldehyde resin. In some embodiments, the phenol-aldehyde resin layer is an electronic grade phenol-aldehyde resin. Examples of phenol-aldehyde resins include, but are not limited to, novolacs, a phenolic formaldehyde resin, naphtol-phenol novolak phenolic resin, phenol-formaldehyde novolak resin and the like. Suitable phenol-aldehyde resins are, but not limited to, Borofen BG-99/M, BG-120/M, (Fenolit d.d.), PSM 4357, PSM 4326, PSM 4327 (GunEi), In some embodiments, the phenol-aldehyde resin layer has melting point of about 60 to about 130° C. In some embodiments, the phenol-aldehyde resin layer has melting point of about 70 to about 130° C., about 75 to about 130° C., about 80 to about 130° C., about 90 to about 130° C., about 100 to about 130° C., about 110 to about 130° C., about 120 to about 130° C., about 70 to about 120° C., about 75 to about 120° C., about 80 to about 120° C., about 90 to about 120° C., about 100 to about 120° C., about 110 to about 120° C., about 70 to about 110° C., 75 to about 110° C., about 80 to about 110° C., about 90 to about 110° C., about 100 to about 110° C., about 70 to about 100° C., about 70 to about 90° C., about 70 to about 80° C., or about 75 to about 100° C.

In some embodiments, the phenol-aldehyde resin layer comprises a phenol-aldehyde resin with an average molecular weight of about 300 to about 7000. In some embodiments, the phenol-aldehyde resin layer comprises a phenol-aldehyde resin with an average molecular weight of about 400 to about 7000, about 500 to about 7000, about 600 to about 7000, about 700 to about 7000, about 800 to about 7000, about 900 to about 7000, about 1000 to about 7000, about 1500 to about 7000, about 2000 to about 7000, about 2500 to about 7000, about 3000 to about 7000, about 3500 to about 7000, about 4000 to about 7000, about 4500 to about 7000, about 5000 to about 7000, about 5500 to about 7000, about 6000 to about 7000, about 6500 to about 7000, about 300 to about 6500, about 400 to about 6500, about 500 to about 6500, about 600 to about 6500, about 700 to about 6500, about 800 to about 6500, about 900 to about 6500, about 1000 to about 6500, about 1500 to about 6500, about 2000 to about 6500, about 2500 to about 6500, about 3000 to about 6500, about 3500 to about 6500, about 4000 to about 6500, about 4500 to about 6500, about 5000 to about 6500, about 5500 to about 6500, about 6000 to about 6500, about 300 to about 6000, about 400 to about 6000, about 500 to about 6000, about 600 to about 6000, about 700 to about 6000, about 800 to about 6000, about 900 to about 6000, about 1000 to about 6000, about 1500 to about 6000, about 2000 to about 6000, about 2500 to about 6000, about 3000 to about 6000, about 3500 to about 6000, about 4000 to about 6000, about 4500 to about 6000, about 5000 to about 6000, about 5500 to about 6000, about 300 to about 5500, about 400 to about 5500, about 500 to about 5500, about 600 to about 5500, about 700 to about 5500, about 800 to about 5500, about 900 to about 5500, about 1000 to about 5500, about 1500 to about 5500, about 2000 to about 5500, about 2500 to about 5500, about 3000 to about 5500, about 3500 to about 5500, about 4000 to about 5500, about 4500 to about 5500, about 5000 to about 5500, about 300 to about 5000, about 400 to about 5000, about 500 to about 5000, about 600 to about 5000, about 700 to about 5000, about 800 to about 5000, about 900 to about 5000, about 1000 to about 5000, about 1500 to about 5000, about 2000 to about 5000, about 2500 to about 5000, about 3000 to about 5000, about 3500 to about 5000, about 4000 to about 5000, about 4500 to about 5000, about 300 to about 4500, about 400 to about 4500, about 500 to about 4500, about 600 to about 4500, about 700 to about 4500, about 800 to about 4500, about 900 to about 4500, about 1000 to about 4500, about 1500 to about 4500, about 2000 to about 4500, about 2500 to about 4500, about 3000 to about 4500, about 3500 to about 4500, about 4000 to about 4500, about 300 to about 4000, about 400 to about 4000, about 500 to about 4000, about 600 to about 4000, about 700 to about 4000, about 800 to about 4000, about 900 to about 4000, about 1000 to about 4000, about 1500 to about 4000, about 2000 to about 4000, about 2500 to about 4000, about 3000 to about 4000, about 3500 to about 4000, about 300 to about 3500, about 400 to about 3500, about 500 to about 3500, about 600 to about 3500, about 700 to about 3500, about 800 to about 3500, about 900 to about 3500, about 1000 to about 3500, about 1500 to about 3500, about 2000 to about 3500, about 2500 to about 3500, about 3000 to about 3500, about 300 to about 3000, about 400 to about 3000, about 500 to about 3000, about 600 to about 3000, about 700 to about 3000, about 800 to about 3000, about 900 to about 3000, about 1000 to about 3000, about 1500 to about 3000, about 2000 to about 3000, about 2500 to about 3000, about 300 to about 2500, about 400 to about 2500, about 500 to about 2500, about 600 to about 2500, about 700 to about 2500, about 800 to about 2500, about 900 to about 2500, about 1000 to about 2500, about 1500 to about 2500, about 2000 to about 2500, about 300 to about 2000, about 400 to about 2000, about 500 to about 2000, about 600 to about 2000, about 700 to about 2000, about 800 to about 2000, about 900 to about 2000, about 1000 to about 2000, about 1500 to about 2000, about 300 to about 1500, about 400 to about 1500, about 500 to about 1500, about 600 to about 1500, about 700 to about 1500, about 800 to about 1500, about 900 to about 1500, about 1000 to about 1500, about 300 to about 1000, about 400 to about 1000, about 500 to about 1000, about 600 to about 1000, about 700 to about 1000, about 800 to about 1000, or about 900 to about 1000.

In some embodiments, the coated particle comprises the phenol-aldehyde resin in an amount of about 0.5% to about 6.0% wt/wt. In some embodiments, the coated particle comprises the phenol-aldehyde resin in an amount of about 1.0% to about 6.0%, about 2.0% to about 6.0%, about 3.0% to about 6.0%, about 4.0% to about 6.0%, about 5.0% to about 6.0%, about 0.5% to about 5.0%, about 1.0% to about 5.0%, about 2.0% to about 5.0%, about 3.0% to about 5.0%, about 4.0% to about 5.0%, about 0.5% to about 4.0%, about 1.0% to about 4.0%, about 2.0% to about 4.0%, about 3.0% to about 4.0%, about 0.5% to about 3.0%, about 1.0% to about 3.0%, about 2.0% to about 3.0%, about 0.5% to about 2.0%, about 1.0% to about 2.0%, or about 0.5% to about 1.0% wt/wt.

Although, certain proppants can be cross-linked downhole or under increased heat and/or pressure, the coated proppant can have a cross-linked (i.e. cured (substantially or fully)) phenol-aldehyde resin layer. It can be cross-linked with any suitable agent. Examples include hexamethylenetetramine, which can also be referred to as "hexa" or "hexamine." Other examples, include, but are not limited to, paraformaldehyde, melamine resin, triphenylphosphine, oxazolidines, and the like, or any combination thereof. Hexamine can also be combined with other cross-linking, curative, agents. In some embodiments, it is cross-linked with about 5% to about 20%, 9% to about 14%, about 10% to about 13%, about 10% to about 12%, about 10% to about 11%, about 9%, about 10%, about 11%, about 12%, or about 13% of the cross-linking agent % wt to the weight of the resin. In some embodiments, the percentage used is about 0-12.5% wt/wt. In some embodiments, it is cross-linked with about 5% to about 20% of the cross linking agent wt/wt.

Coating stability and leachate tests under temperature and presence of water were performed using an autoclave. The autoclave test can determine the percent weight loss of resin after the proppant is submerged in DI water at 250° F. and 15 psi for three days. 20 g of proppant is placed in a pint size mason jar, filled to the top with DI water and sealed tight. The concentration of proppant in water was in the range of 2-5 lbs of proppant per gallon of water in order to simulate the concentration of proppant in frac fluids. Using a benchtop Electric Autoclave, the mason jar is placed in the autoclave, the top and bottom rim of the autoclave is coated with vacuum grease and the lid is closed tight. After the three day testing is complete, the sample was rinsed with DI water and dried in an oven at 125° F. for 24 hours. A Loss on Ignition (LOI) test was performed according to ISO 13503-2:2006 pre-autoclave and post-autoclave to determine the overall wt. % loss. Samples for leachate tests were prepared under the same experimental procedures as above. The only exception was the amount of proppant (270 g) and the amount of DI water (740 g). After the three days of testing, the supernatant was collected, immersed into vials and sent to a third party lab under controlled temperature. The samples were tested within 72 hours of collection.

In some embodiments, the coated particle leaches an amount of free phenol into a water sample that is less than or equal to about 0.1, about 0.2, about 0.3, about 0.4, about 0.5, about 0.6, about 0.7, about 0.8, about 0.9, about 1.0, about 1.5 or about 2.0 ppm. In some embodiments, the coated particle leaches an amount of free phenol into a water sample that is less than or equal to about 0.1 to about 2.0 ppm, about 0.5 to about 2.0 ppm, about 1.0 to about 2.0 ppm, about 1.5 to about 2.0 ppm, about 0.1 to about 1.0 ppm, about 0.5 to about 1.0 ppm. The method used to determine the levels of free phenol into water was the U.S. Environmental Protection Agency Method 420.4 (Determination of Total Recoverable Phenolics by Semi-Automated Colorimetry) performed by a third party chemical lab.

In some embodiments, the coated particle leaches an amount of free formaldehyde into a water sample that is less than or equal to 3.0 ppm or 3000 µg/l. The method used to determine the levels of free formaldehyde into water was the U.S. Environmental Protection Agency Method 8315A (Determination of Carbonyl Compounds by High Performance Liquid Chromatography (HPLC)) performed by a third party chemical lab.

In some embodiments, the coated particle is stable at about 275° C., about 300° C., or about 315° C. In some embodiments, the coated particle is stable at a temperature of at least 275° C., 300° C., or 315° C.

In some embodiments, the coated particle comprises less than or equal to 5% fillers. In some embodiments, the coated particles comprises less than or equal to 1%, 2%, 3%, or 4% fillers. In some embodiments, the coated particles comprise less than or equal to 1%, 0.5%, or 0.1% fillers. Examples of fillers include, but are not limited to, silica, alumina, fumed carbon, carbon black, graphite, mica, titanium dioxide, meta-silicate, calcium silicate, kaolin, talc, zirconia, boron, fly ash, hollow glass microspheres, solid glass, or any combination thereof.

In some embodiments, processes for preparing a coated particle are provided. In some embodiments, the process comprises coating a particle with at least one phenol-aldehyde resin layer and at least one epoxy emulsion layer. In some embodiments, the phenol-aldehyde resin layer has less than or equal to 0.5 wt. % free phenol or other characteristics as described herein.

In some embodiments, the process comprises coating the particle with a first layer of a phenolic aldehyde resin layer and then an outer layer of an epoxy emulsion layer. The outer layer can also be a polyurethane layer as described herein.

In some embodiments, prior to coating the particle with the epoxy emulsion layer, the epoxy emulsion is mixed with a curing agent or hardener. Examples of epoxy hardeners and curing agents include, but are not limited to, aliphatic amines (e.g. Diethylene triamine (DETA), triethylenetetraamine (TETA), tetraethylenepentamine (TEPA), amino-ethylpiperazine (N-AEP), m-xylenediamine (MXDA), 2-methylpentanediamine (MPMD)); cycloaliphatic amines (e.g. Isophoronediamine (IPDA), methylene-di(cyclohexylamine) (PACM), diaminocyclohexane); aromatic amines (e.g. 4,4'-Diaminodiphenyl methane (DDM), 4,4'-Diamino-diphenyl sulfone (DDS), methylene-bis(diisopropylaniline) (MPDA), methylene-bis(dimethylaniline), diethyl toluene diamine (DETDA); and anhydrides (e.g., hexahydrophthalic acid anhydride, dicyclopentadiene dianhydride, mellitic anhydride, methyl tetrahydrophthalic anhydride, and nadic methyl anhydride). In some embodiments, the hardener or curing agent is triethylenetetraamine. In Some embodiments, a a ratio of epoxy reactive sites to amine reactive sites is about of 0.8-1.2 (epoxy equivalent weight to amine equivalent weight).

In some embodiments, the methods comprise curing the at least one phenol-aldehyde resin layer with a curative agent, wherein the curative agent is applied in an amount of about 5 to about 15 wt. % of the phenol-aldehyde resin. The curing agent can be added prior to the phenol-aldehyde resin being coated onto the particle or simultaneously with the phenol-aldehyde resin being coated onto the particle. In some embodiments, the curative agent is added in an amount of about 9% to about 14%, about 10% to about 13%, about 10% to about 12%, about 10% to about 11%, about 9%, about 10%, about 11%, about 12%, or about 13% of the curative agent, which can also be referred to as a cross-linking agent. In some embodiments, the curative agent is hexamethylenetetramine, paraformaldehyde, melamine resin, triphenylphosphine, oxazolidines, or any combination thereof.

In some embodiments, the epoxy emulsion is contacted with the particle in amount of about 0.25 to about 2.00% wt/wt solids. In some embodiments, the epoxy emulsion is contacted with the phenol-aldehyde resin coated particle in amount of about 0.25 to about 2.00% wt/wt solids.

In some embodiments, the particle is contacted with a first amount of a phenol-aldehyde resin to form a first layer surrounding the particle. As described herein, the layer can take different forms and still be considered a layer. In some embodiments, the first layer is cured with a curative agent, such as those described herein in an amount as described herein. The first layer can also be a combination of a phenol-aldehyde resin and an epoxy resin. Combinations of such resins are described herein.

In some embodiments, the particle coated with a first layer (fully cured, substantially cured, or uncured) is coated with a second layer. The second layer can be the same or different as compared to the first layer. The second layer can, for example, be a phenol-aldehyde resin layer. The phenol-aldehyde resin layer can have a lower average molecular weight as compared to the first layer or a third layer, if present. In some embodiments, the second layer is an epoxy emulsion. The second layer can be applied as a combination of the epoxy emulsion with the hardener. In some embodiments, the second layer is the outermost layer.

In some embodiments, the particle with the first and second layer is coated with a third layer. In some embodiments, the particle with the first and second layer is mixed with a phenol-aldehyde resin, which can be added with the curative agent, or the curative agent can be added after the resin is mixed with the particle coated with the first and second layer. The third layer can be the same or different as compared to the first and second layer. In some embodiments, the third layer is a phenol-aldehyde resin layer.

In some embodiments, the phenol-aldehyde resin layer is fully or substantially cured. In some embodiments, the second layer has an average molecular weight that is about, or at least, 1, 2, 4, 5, 10, 15, 20, or 25% lower than the average molecular weight of the third layer.

In some embodiments, the particle coated with a first, second, and third layer, is coated with a fourth layer of a resin. In some embodiments, the fourth layer is the outermost layer. When the fourth layer is the outermost layer it can be referred to as a topcoat. In some embodiments, the fourth layer is an epoxy emulsion layer. Accordingly, in some embodiments, the particle coated with a first, second, and third layer is mixed with an epoxy emulsion and a hardener. This is done under conditions sufficient encapsulate the particle with the epoxy emulsion layer. In some embodiments, the water present in the emulsion layer is removed with heating. In some embodiments, the water present in the emulsion is removed without heat.

The materials can be added or coated onto the particle according to the examples provided herein. Additionally, other methods can be used. In some embodiments, the particle is heated prior to being contacted or mixed with the coatings and materials described herein. In some embodiments, the particle, such as, but not limited to sand, is heated to a temperature of about 340 to 460 F prior to the coatings being added. In some embodiments, the particle is heated simultaneously or nearly simultaneously as the addition of the coatings.

In some embodiments, prior to coating the sand with any layers of phenol-aldehyde resin, epoxy emulsion layer, or polyurethane layer, the sand is mixed with a hydroxy-terminated amino-functional silane. Any suitable hydroxy-terminated amino-functional silane can be used.

In some embodiments, a particle is prepared with an epoxy-emulsion outer layer. In some embodiments, the method comprises heating the particle is heated to a temperature of about 400 to about 450° F. The particle can be added to a mixer or heated in the mixer. In some embodiments, the sand is mixed with a hydroxy-terminated amino-functional silane. In some embodiments, the sand is mixed with a phenol-aldehyde resin (e.g. Novolac). In some embodiments, the sand is mixed with a curative agent. In some embodiments, the sand is then mixed with a phenol-aldehyde resin. This can be the same resin as the previous step or a different resin. The sand can then be mixed again with a curative agent. This can be the same curative agent as the previous step or a different curative agent. The sand can then be mixed again with a phenol-aldehyde resin. In some embodiments, it is the same resin or a different resin as the previous steps. The sand can be cured again with the same or different curative agent. The sand coated with the layers of the phenol-aldehyde resin can then be coated with an epoxy emulsion such as, but not limited to, Dow Chemical DER 916 or XZ92546.01 and an amine epoxy hardener such as, but not limited to DEH 24 and or DEH 58. The coated sand can then be mixed with an oil, such as, but not limited to silicone oil. The coated sand can then be discharged or removed from the mixer. The epoxy emulsion, resin, and curative agent that can be used can be any emulsion, resin, and curative agent described herein or that is suitable for a proppant. The agents can be mixed with the sand for as little as about 1, about 2, about 3, about 4, about 5, or about 5 to 10 seconds, or any suitable time to coat and cure the sand. Non-limiting time periods are provided in the examples.

In some embodiments, a process of coating a particle with an epoxy-emulsion outer layer comprises heating a particle to about 380 to about 420° F. The particle can be heated prior to or in a mixer. In some embodiments, the heated particle is mixed with a hydroxy-terminated amino-functional silane. In some embodiments, the sand is then mixed with a phenol-aldehyde resin. In some embodiments, the resin is cured. In some embodiments, the sand is then coated with an epoxy emulsion such as, but not limited to, Dow Chemical DER 916 or XZ92546.01 and an amine epoxy hardener such as, but not limited to, DEH 24 and or DEH 58. The coated sand can then be used or mixed with silicone oil and/or a surfactant and then used or removed from the mixer. The times for adding the materials can be the same as described herein and above or as shown in the Examples. However, in some embodiments the times can be adjusted according the desires of the user.

In some embodiments, process for preparing a particle comprising a phenolic layer and a polyurethane coating as an outer layer are provided. In some embodiments, the process comprises heating the particle (e.g. sand) to a temperature of about 380 to about 420° F. This can be done prior to being added to a mixer or while the particle is in a mixer. In some embodiments, the heated particle is mixed with a hydroxy-terminated amino-functional silane. In some embodiments, the particle mixed with the hydroxy-terminated amino-functional silane is mixed with a phenol-aldehyde resin. In some embodiments, the resin coated particle is cured with a curative agent. In some embodiments, the cured particle is mixed with water. In some embodiments, the cured particle mixed with water is mixed with a polyol (e.g., Dow Chemical 801X) and a isocyanate (e.g. Dow Chemical 17557). The particle is then coated with a phenol-aldehyde resin and a polyurethane outer layer. The coated particle can be used or removed from the mixer. In some embodiments, the coated particle is mixed with silicone oil and/or a surfactant before being used or removed from the mixer.

In some embodiments, methods of treating a subterranean formation are provided. In some embodiments, the subterranean formation is penetrated by a wellbore. In some embodiments, the method comprises contacting the subterranean formation with a coated particle as described herein. Because of the properties of the coated particles described herein, the coated particles can be used in subterranean formations that are near or in close proximity to sources of drinking water because the risk of contamination with free phenol or formaldehyde is low. Therefore, in some embodiments, the subterranean formation is near a source of drinking water. A source of drinking water is near or in close proximity if there is a risk of contamination into that source of drinking water. In some embodiments, the subterranean formation is within a mile, a half-mile, quarter-mile, one tenth of a mile, or closer, of a source of drinking water. In some embodiments, the source of drinking water is a well or an aquifer. In some embodiments, the coated particles are injected into the subterranean formation. In some embodiments, the coated particles that are contacted with the subterranean formation are prepared according to a process described herein.

EXAMPLES

Example 1

Table 1 shows the sequence of actions, times of addition and ingredients that were used for preparing a three phenolic layer 20/40 proppant with an epoxy emulsion as an outer layer. The timings below are non-limiting and can be varied.

TABLE 1

| TIMING | STEP |
| --- | --- |
| 0:00 | 2000 g of 20/40 mesh preheated sand 400-450° F. is added to a lab mixer |
| 0:04 | 6 g of a hydroxy-terminated amino-functional silane is added with mixing over a 5 second period |
| 0:20 | 25.78 g Phenol-aldehyde Novolac resin over a 5 second period |
| 0:50 | 3.22 g of Hexamine solution |
| 1:15 | 25.78 g Phenol-aldehyde Novolac resin over a 5 second period |
| 1:40 | 3.22 g of Hex amine solution |
| 2:10 | 25.78 g Phenol-aldehyde Novolac resin over a 5 second period |
| 3:00 | 3.22 g of Hexamine solution |
| 3:20 | 21.56 g of a mixture of an epoxy emulsion such as Dow Chemical DER 916 or XZ92546.01 and an amine epoxy hardener such as DEH 24 and or DEH 58 |
| 4:00 | 2 g of a silicone oil |
| 4:15 | Coated sand is discharged |

Figure 1:
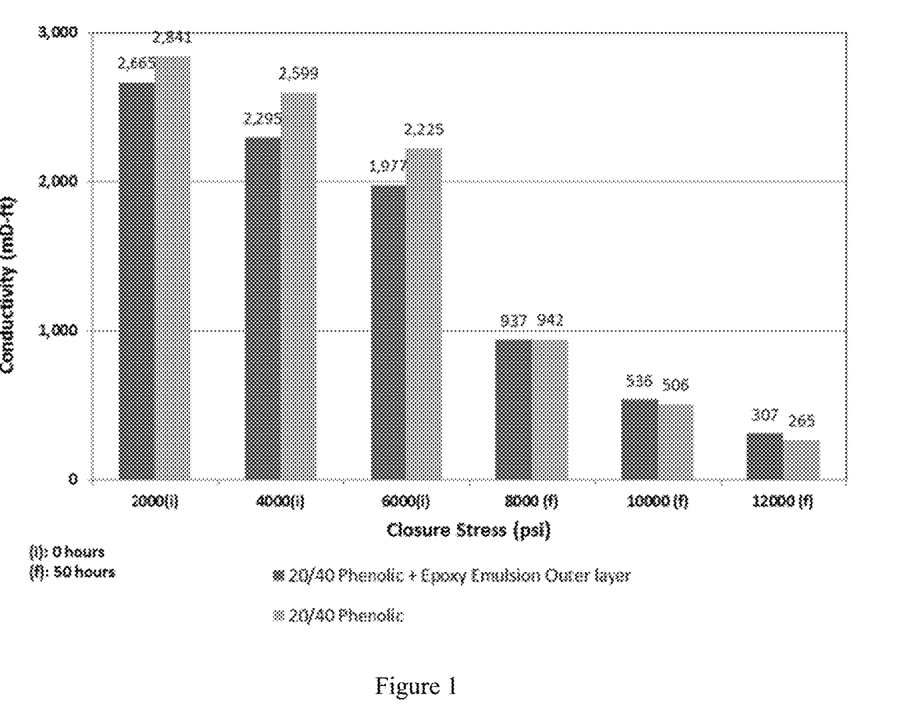
FIG. 1 illustrates a graph of conductivity versus closure stress (20/40 mesh). The conductivity was tested at a third party lab (StimLab) at 250° F., a concentration of 2 lb/ft$^2$ and a flow rate of 2 mL/min according to ISO 13503-5:2006.

Conductivity evaluations of the 20/40 proppant with three phenolic layers and an epoxy emulsion outer layer versus a control sample of a phenolic without the epoxy emulsion outer layer were conducted according to ISO 13503-5:2006. The effect of the epoxy emulsion layer on the conductivity performance of the proppant at high closure stresses (higher than 8,000 psi) is illustrated in FIG. 1. The sample with the phenol-aldehyde resin with an epoxy outer layer exhibited a 5.9% and 15.8% increase of conductivity at closure stresses of 10,000 psi and 12,000 psi respectively versus the control sample of a phenolic without the epoxy emulsion layer.

An additional advantage of an epoxy emulsion outer layer was the significant reduction (55-65%) in agglomerated particles (clusters of 2 or more) that would not be suitable to be used as proppants according to ISO 13503-2:2006, and during the proppant coating process are screened out of the final product.

TABLE 2

Crush Resistance ISO 13503-2:2006

| Sample | Crush Resistance at 15,000 psi (wt. %) |
|---|---|
| 20/40 Phenolic + Epoxy Emulsion Outer layer | 2.48 |
| 20/40 Phenolic | 3.86 |

Crush tests were performed according to ISO13503-2: 2006. Table 2 shows that an epoxy emulsion outer layer reduces the fines generation by 36%.

Example 2

Table 3 shows the sequence of actions, times of addition and ingredients that were used for preparing of a phenolic layer 30/50 proppant with a polyurethane coating as an outer layer.

TABLE 3

| TIMING | STEP |
|---|---|
| 0:00 | 2000 g of 30/50 mesh preheated sand 380-420° F. is added to a lab mixer |
| 0:04 | 6 g of a hydroxy-terminated amino-functional silane is added with mixing over a 5 second period |
| 0:20 | 35.56 g Phenol-aldehyde Novolac resin over a 5 second period |
| 0:50 | 4.44 g of Hexamine solution |
| 4:00 | Addition of water (16-20 g) |
| 4:10 | 2.85 g of a Polyol such as Dow Chemical 801X |
| 4:15 | 5.15 g of a Isocyanate such as Dow Chemical 17557 |
| 5:00 | 0.50 g of a silicone oil |
| 5:15 | 0.50 g of a Surfactant |
| 5:30 | Discharge |

Figure 2:
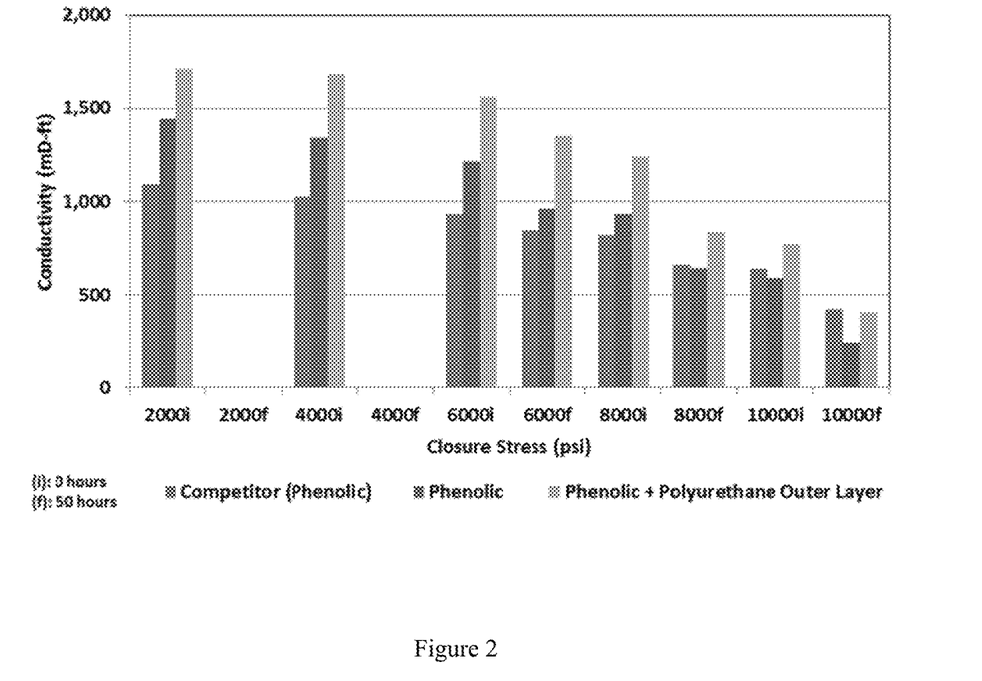
FIG. 2 illustrates a graph of conductivity versus closure stress (30/50 mesh). The conductivity was tested at a third party lab (StimLab) at 250° F., a concentration of 2 lb/ft$^2$ and a flow rate of 2 mL/min according to ISO 13503-5:2006.

The effect of the polyurethane outer layer on the conductivity performance of the proppant at high closure stresses is illustrated in FIG. 2 where the sample with the polyurethane outer layer outperformed the one without the polyurethane outer layer by 67% at 10,000 psi closure stress.

Example 3

Table 4 shows the sequence of actions, times of addition and ingredients that were used for preparing a 30/50 proppant with a phenolic layer and a polyurethane coating as an outer layer.

TABLE 4

| TIMING | STEP |
|---|---|
| 0:00 | 2000 g of 30/50 mesh preheated sand 380-420° F. is added to a lab mixer |
| 0:04 | 6 g of a hydroxy-terminated amino-functional silane is added with mixing over a 5 second period |
| 0:20 | 32.0 g Phenol-aldehyde Novolac resin over a 5 second period |
| 0:50 | 4.0 g of Hexamine solution |
| 4:00 | Addition of water (16-20 g) |
| 4:10 | 2.85 g of a Polyol such as Dow Chemical 801X |
| 4:15 | 5.15 g of a Isocyanate such as Dow Chemical 17557 |
| 5:00 | 0.50 g of a silicone oil |
| 5:15 | 0.50 g of a Surfactant |
| 5:30 | Discharge |

Table 5 shows the sequence of actions, times of addition and ingredients that were used for preparing a 30/50 proppant with a phenolic layer and an epoxy emulsion as an outer layer.

TABLE 5

| TIMING | STEP |
|---|---|
| 0:00 | 2000 g of 30/50 mesh preheated sand 380-420° F. is added to a lab mixer |
| 0:04 | 6 g of a hydroxy-terminated amino-functional silane is added with mixing over a 5 second period |
| 0:20 | 32.0 g Phenol-aldehyde Novolac resin over a 5 second period |
| 0:50 | 4.0 g of Hexamine solution |
| 3:30 | 12.74 g of a mixture of an epoxy emulsion such as Dow Chemical DER 916 or XZ92546.01 and an amine epoxy hardener such as DEH 24 and or DEH 58 |
| 4.05 | 0.50 g of a silicone oil |
| 4.15 | 0.50 g of a Surfactant |
| 4:30 | Discharge |

In order to simulate the pH conditions that the proppant would encounter as it would be blended with high alkalinity frac fluids, the samples (1200 g) of 30/50 phenolic with a polyurethane outer layer, phenolic with an epoxy emulsion outer layer, and a phenolic as a control were immersed into tap water (2400 g) and the pH was adjusted to 10 (potassium hydroxide and Polylink BXL—0.2 buffer, PfP Technology, LLC). The mixture was blended for 2 hours while the temperature was controlled within the range of 175-200° F. After the treatment, the water solution was removed from the mixture, and the proppant was adequately rinsed with water before drying. A Loss on Ignition (LOI) test was performed according to ISO 13503-2:2006 for the pretreated and post-treated samples to determine the overall wt. % loss. Table 6 shows the resin losses of a proppant with a phenolic with a polyurethane outer layer versus a phenolic with an epoxy emulsion outer layer versus a phenolic.

TABLE 6

|  | Phenolic + Polyurethane Outer Layer | Phenolic + Epoxy Emulsion Outer Layer | Phenolic |
|---|---|---|---|
| LOI as Coated (wt. %) | 2.06 | 2.13 | 1.78 |
| LOI after pH treatment for 2 hours (wt. %) | 1.94 | 2.09 | 1.5 |
| % Loss after pH treatment | 5.83% | 1.88% | 15.73% |

Figure 3:
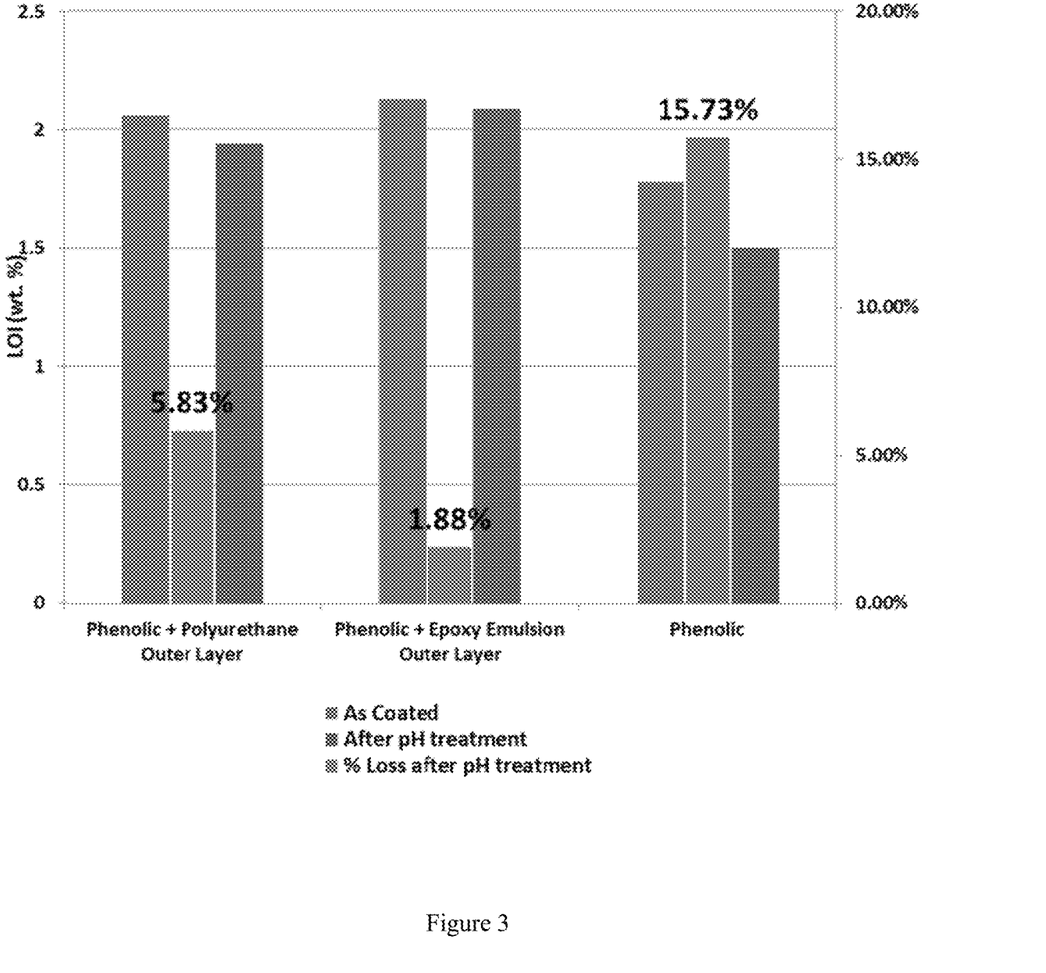
FIG. 3 illustrates a graph of the LOI losses under 2 hours exposure of the proppant in high pH fracturing fluids. The left bar of each set, is as coated, the middle bar of each set is, after pH treatment, and the right bar of each set is % Loss after pH treatment.

FIG. 3 illustrates the stability of both the phenolic with polyurethane outer layer and the phenolic with epoxy-emulsion outer layer vs. the phenolic only sample. The phenolic coating exhibited 15.73 wt. % losses where the phenolic with the polyurethane outer layer exhibited 5.83 wt. % losses and the phenolic with the epoxy emulsion outer layer exhibited only 1.88 wt. % losses.

Figure 4:
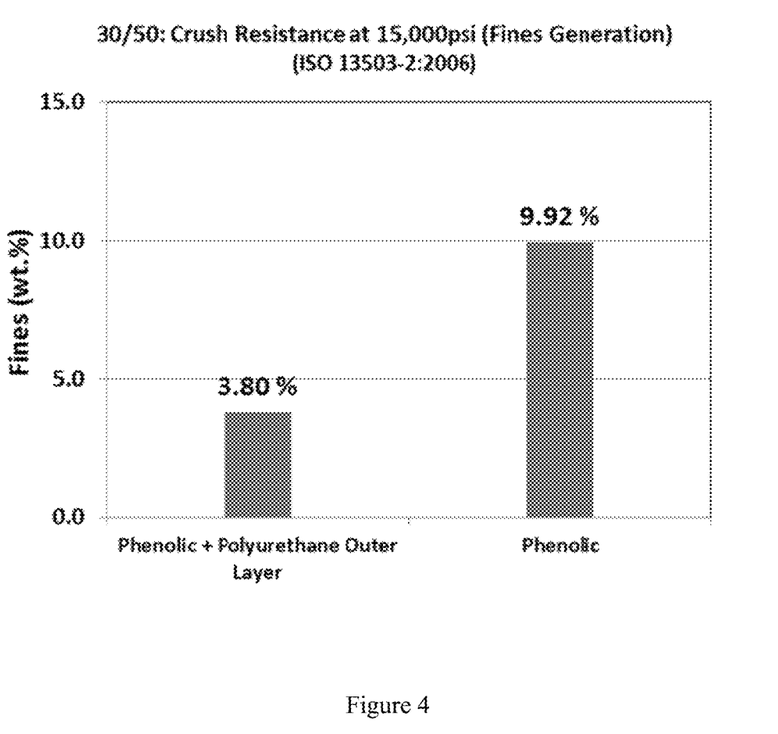
FIG. 4 illustrates a graph of the increased crush resistance at 15,000 psi closure stress, test performed according to ISO 13503-2:2006.

The crush resistance of different coated proppants was compared. A proppant that was prepared according to the examples provided herein with a phenolic and polyurethane outer layer was compared to a proppant coated with only a phenolic coating. The crush resistance, which can be measured by fines generation was measured at a stress level of of 15,000 psi according to ISO 13503-2:2006). The effect of the Polyurethane outer layer (30/50) on the crush resistance is illustrated in FIG. 4. The phenolic with polyurethane outer layer exhibited a 61.7% decrease in fines generation vs. the Phenolic only sample under the same closure stress level of 15,000 psi (ISO 13503-2:2006). This data demonstrates the superior properties of the coated particle. This is an unexpected property and advantage of the high performance coatings and the significant difference between the two coatings could not have been predicted.

These examples demonstrate some of the unexpected properties and advantages of the high performance proppants. The proppants described herein can be used to better extract oil and gas from a well.

Various references and patents are disclosed herein, each of which are hereby incorporated by reference for the purpose that they are cited.

From the foregoing, it will be appreciated that various embodiments of the present disclosure have been described herein for purposes of illustration, and that various modifications can be made without departing from the scope and spirit of the present disclosure. Accordingly, the various embodiments disclosed herein are not intended to be limiting.

What is claimed is:

1. A coated particle comprising:
   a particle; and
   a coating adhered to the particle, wherein the coating comprises:
   a first layer comprising a silane coupling agent;
   a second layer the first layer, wherein the second layer is a phenolic resin coating;
   a third layer in contact with the second layer, wherein the third layer is a phenolic resin coating; and
   a fourth layer in contact with the third layer, wherein the fourth layer is a polyurethane coating admixed with a surfactant,
   wherein the fourth layer completely encapsulates the first, second, and third layers.

2. The coated particle of claim 1, wherein the polyurethane coating is an outer layer.

3. The coated particle of claim 1, wherein the particle is sand, silica, rocks, minerals, ceramic, bauxite, polymeric particles, or any combination thereof.

4. The coated particle of claim 1, wherein the second and third layer has less than or equal to 0.5% wt free phenol.

5. The coated particle of claim 1, wherein the coating comprises an additional phenolic resin layer encapsulated by the polyurethane.

6. The coated particle of claim 1, wherein at least one of second and third layers is fully cured.

7. The coated particle of claim 1, wherein one of the second layer and third layer is a fully cured phenolic resin coating and the other is a partially cured phenolic resin coating.

8. The coated particle of claim 1, wherein the melting point of the phenolic resin layer is about 60° C. to about 130° C.

9. The coated particle of claim 1, wherein the coated particle comprises the phenolic resin in an amount of about 0.5% to about 6.0% wt/wt.

10. The coated particle of claim 1, wherein the coated particle leaches an amount of free phenol into a water sample that is less than or equal to 2.0 ppm.

11. The coated particle of claim 1, wherein the coated particle comprises less than or equal to about 5% wt fillers.

12. A method of treating a subterranean formation penetrated by a wellbore comprising contacting the subterranean formation with a coated particle of claim 1.

13. The coated particle of claim 1, wherein the second layer phenolic resin coating is a phenol-aldehyde resin.

14. The coated particle of claim 1, wherein the third layer phenolic resin coating is a phenol-aldehyde resin.

15. The coated particle of claim 1, wherein the second, third, and fourth layer are substantially cured.

16. A plurality of particles consisting of the coated particles of claim 1.

17. The coated particle of claim 1 wherein, wherein the third layer completely encapsulates the second layer.

18. The coated particle of claim 1, wherein the second layer completely encapsulates the first layer.

19. The coated particle of claim 1, wherein the third layer completely encapsulates the second layer and the second layer completely encapsulates the first layer.

20. A process for preparing the coated particles of claim 16, the process comprising:
   coating the particles with the silane coupling agent to produce the silane coupling agent coated particles;
   coating the silane coupling agent coated particles with the phenolic resin coating to produce one layer phenolic resin coated particles;
   coating the one layer phenolic resin coated particles with the phenolic resin coating to produce two layer phenolic resin coated particles; and
   coating the two layer phenolic resin coated particles with the polyurethane coating admixed with the surfactant that completely encapsulates the two layer phenolic resin coated particles to produce the coated particles of claim 16,
   wherein the phenolic resin layers have less than or equal to 0.5 wt % free phenol.

* * * * *

UNITED STATES PATENT AND TRADEMARK OFFICE
CERTIFICATE OF CORRECTION

PATENT NO. : 10,590,337 B2
APPLICATION NO. : 15/153099
DATED : March 17, 2020
INVENTOR(S) : Monastiriotis et al.

Page 1 of 1

It is certified that error appears in the above-identified patent and that said Letters Patent is hereby corrected as shown below:

In the Claims

In Claim 1, Column 17, Line 24, insert -- in contact with -- after "a second layer".

Signed and Sealed this
Fifteenth Day of December, 2020

Andrei Iancu
*Director of the United States Patent and Trademark Office*